United States Patent
Jeong et al.

(10) Patent No.: US 9,406,260 B2
(45) Date of Patent: Aug. 2, 2016

(54) DISPLAY DEVICE AND DRIVING METHOD THEREOF

(71) Applicant: Samsung Display Co., Ltd., Yongin, Gyeonggi-Do (KR)

(72) Inventors: Jin-Tae Jeong, Yongin (KR); Hwan-Soo Jang, Yongin (KR); Jae-Du Noh, Yongin (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 64 days.

(21) Appl. No.: 14/039,261

(22) Filed: Sep. 27, 2013

(65) Prior Publication Data

US 2014/0313138 A1    Oct. 23, 2014

(30) Foreign Application Priority Data

Apr. 22, 2013  (KR) .......................... 10-2013-0044415

(51) Int. Cl.
*G09G 3/32*    (2016.01)
*G06F 3/041*   (2006.01)

(52) U.S. Cl.
CPC ............ *G09G 3/3258* (2013.01); *G06F 3/0412* (2013.01); *G06F 3/0416* (2013.01); *G09G 3/3241* (2013.01); *G09G 2310/0251* (2013.01); *G09G 2310/0262* (2013.01)

(58) Field of Classification Search
CPC . G09G 3/3258; G09G 3/3208; G09G 3/3255; G09G 3/3233; G09G 3/3241; G09G 3/325; G06F 3/041; G06F 3/0416; G06F 3/044; G06F 3/045

See application file for complete search history.

(56) References Cited

U.S. PATENT DOCUMENTS

| | | | |
|---|---|---|---|
| 7,180,486 B2 * | 2/2007 | Jeong | 345/82 |
| 7,812,827 B2 * | 10/2010 | Hotelling et al. | 345/173 |
| 8,743,300 B2 * | 6/2014 | Chang et al. | 349/12 |
| 8,810,610 B2 * | 8/2014 | Hong et al. | 345/690 |
| 2010/0007649 A1 * | 1/2010 | Tanikame et al. | 345/213 |
| 2010/0097352 A1 * | 4/2010 | Ahn et al. | 345/175 |
| 2010/0097391 A1 * | 4/2010 | Ahn et al. | 345/589 |
| 2011/0122096 A1 * | 5/2011 | Kim et al. | 345/175 |
| 2012/0147000 A1 * | 6/2012 | Song et al. | 345/419 |
| 2013/0057511 A1 * | 3/2013 | Shepelev et al. | 345/174 |

FOREIGN PATENT DOCUMENTS

| | | | |
|---|---|---|---|
| KR | 10-2010-0005855 A | 1/2010 | |
| KR | 10-2012-0057403 A | 6/2012 | |
| KR | 10-2012-0067250 A | 6/2012 | |

* cited by examiner

*Primary Examiner* — Jonathan Boyd
*Assistant Examiner* — Sardis Azongha
(74) *Attorney, Agent, or Firm* — Robert E. Bushnell, Esq.

(57) ABSTRACT

A display device including: a plurality of first electrodes each corresponding to a plurality of light emitting groups on a plurality of pixels including organic light emitting diodes (OLEDs) and a plurality of second electrodes formed on the plurality of first electrodes, having an insulating layer therebetween, wherein a plurality of touch sensing signals are applied to each of the plurality of first electrodes during a non-light emitting period of each of the plurality of light emitting groups and a touched position is determined in response to a magnitude in voltage between the first and second electrodes by a touch from the outside.

19 Claims, 13 Drawing Sheets

DISPLAY DEVICE AND DRIVING METHOD THEREOF

CLAIM OF PRIORITY

This application makes reference to, incorporates the same herein, and claims all benefits accruing under 35 U.S.C §119 from an application earlier filed in the Korean Intellectual Property Office on the 22 Apr. 2013 and there duly assigned Serial No. 10-2013-0044415.

BACKGROUND OF THE INVENTION

1. Field of the Invention

Embodiments of the present invention relate to a display device and a driving method thereof, and more particularly, a technology of an organic light emitting diode (OLED) display having a touch sensing function and a driving method thereof.

2. Description of the Related Art

An organic light emitting diode (OLED) display includes a display panel displaying images through a plurality of pixels each including organic light emitting diodes (OLEDs) which are a self-light emitting element.

The display panel of the OLED includes a plurality of scan lines formed in a row direction and a plurality of data lines formed in a column direction and the plurality of pixels each display an image of one frame by using the OLED emitting light by scan signals and data signals which are transferred from the corresponding scan lines and the corresponding data lines.

The display panel has also been used as an input device which may perform an input through a direct touch by a hand or a pen.

The display panel having a touch sensing function needs a plurality of X-axis lines extending in a row direction and a plurality of Y-axis lines extending in a column direction to recognize the touched positions. As a result, a volume of the display panel having a touch sensing function increases.

In a liquid crystal display (LCD) having the touch sensing function, there is provided a method of using a common electrode line connected to a common electrode on a backplane as the X-axis line to reduce the number of additional lines for sensing a touch. Even though the common electrode is swung, the LCD does not affect luminance, such that there is no need to control emission.

However, since in the OLED, the lines on the backplane affects luminance, there is a need to control the emission at the time of performing the touch sensing function in the case in which the lines on the backplane are used as the X-axis lines to reduce the number of sensing lines like the LCD.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention have been made in an effort to provide a display device capable of reducing the number of lines for sensing a touch without changing image luminance and a driving method thereof.

An exemplary embodiment of the present invention provides a display device. The display device includes: a display unit which includes a plurality of pixels including organic light emitting diodes (OLEDs) and is divided into a plurality of light emitting groups; a light emitting driving unit which generates a plurality of light emitting signals controlling a light emitting period and a non-light emitting period of each of the plurality of light emitting groups; a touch sensing unit which includes a plurality of first electrodes formed on the plurality of pixels in a first direction and corresponding to each of the plurality of light emitting groups, and a plurality of second electrodes formed on the plurality of first electrodes in a second direction, having an insulating layer therebetween, and outputs a magnitude of voltage between the first electrode and the second electrode by a touch from the outside as a sensing signal; and a touch determination unit which applies touch scan signals to each of the plurality of first electrodes during the non-light emitting period of each of the plurality of light emitting groups and determines a touched position in response to the sensing signal of the touch sensing unit.

Each of the plurality of first electrodes may be cathode electrodes of the plurality of organic light emitting diodes of the plurality of light emitting groups.

The touch scan signal may have a voltage level higher than first power supply voltage during the non-light emitting period.

The touch scan signal may alternately have the voltage level higher than the power supply voltage and the power supply voltage during the non-light emitting period.

The display device may further include: a scan driving unit which selectively applies a plurality of scan signals to a plurality of scan lines formed in a region corresponding to the corresponding light emitting group during the non-light emitting period of each of the plurality of light emitting groups.

The touch determination unit may output the touch scan signal having the voltage level higher than the power supply voltage to the corresponding first electrode using the plurality of scan signals during the non-light emitting period of each of the plurality of light emitting groups.

The touch determination unit may output the power supply voltage in response to the light emitting signal of the corresponding light emitting group during the light emitting period of each of the plurality of light emitting groups.

The touch determination unit may include a plurality of signal controllers which generate the plurality of touch scan signals, and each of the plurality of signal controllers may include: a plurality of first transistors which are turned on in response to each of the plurality of scan signals applied to the plurality of scan lines to output the voltage level higher than the power supply voltage; and a plurality of second transistors which output the power supply voltage in response to a light emitting signal applied to the corresponding light emitting group.

The display device may further include: a scan driving unit which selectively applies a plurality of first and second scan signals to a plurality of first and second scan lines formed in the corresponding region during the non-light emitting period of each of the plurality of light emitting groups.

Each pixel of the region corresponding to each light emitting group may include: a first transistor having a control electrode, a first electrode is electrically connected to a first power supply, and a second electrode in which current corresponding to voltage between the control electrode and the first electrode flows; a second transistor which is turned on in response to the corresponding first scan signal to apply initialization voltage to the control electrode of the first transistor; a third transistor which is turned on in response to the corresponding second scan signal to diode-connect the first transistor; a fourth transistor which is turned on in response to the corresponding second scan signal to apply corresponding data voltage to the first electrode of the first transistor; and a fifth transistor which is turned on in response to the corresponding light emitting signal to transfer current to the OLED. In this case, the second transistor may be turned on by the corresponding first scan signal and then the third and fourth transistors may be turned on by the corresponding second scan signal.

The touch determination unit may output a touch scan signal alternately having the power supply voltage and the voltage level higher than the power supply voltage using the plurality of first and second scan signals during the non-light emitting period of each of the plurality of light emitting groups.

The touch determination unit may include a plurality of signal controllers which generate the plurality of touch scan signals, and each of the plurality of signal controllers may include: a plurality of sixth transistors which are turned on in response to each of the plurality of first scan signals applied to the plurality of first scan lines corresponding to the corresponding light emitting groups to output a first voltage level higher than the power supply voltage; a plurality of sixth transistors which are turned on in response to each of the plurality of second scan signals applied to the plurality of second scan lines corresponding to the corresponding light emitting groups to output the power supply voltage; and a plurality of seventh transistors which output the power supply voltage in response to a light emitting signal applied to the corresponding light emitting group.

Each pixel corresponding to each light emitting group may further include a capacitor which is connected between the first power supply and the control electrode of the first transistor.

Another exemplary embodiment of the present invention provides a driving method of a display device displaying an image through a plurality of pixels each of which is connected to a plurality of data lines, a plurality of scan lines, and a plurality of light emitting control lines and includes a plurality of organic light emitting diodes (OLEDs). The driving method includes: applying first voltage level of light emitting signals to light emitting control lines of a first light emitting group among a plurality of light emitting groups during a first period to block a supply of current to the OLED of the first pixel group corresponding to the first light emitting group; applying second voltage level of light emitting signals to light emitting control lines of the first light emitting group during a second period to transfer current corresponding to a plurality of first data voltages to the OLED of the first pixel group; and determining a touch from the outside, based on a sensing signal of a first touch sensing unit formed on the first pixel group during the first period.

The driving method of a display device may further include: applying the first voltage level of light emitting signals to light emitting control lines of a second light emitting group among the plurality of light emitting groups during a third period to block a supply of current to the OLED of a second pixel group corresponding to the second light emitting group; applying the second voltage level of light emitting signals to light emitting control lines of the second light emitting group during a fourth period to transfer current corresponding to a plurality of second data voltages to the OLED of the second pixel group; and determining a touch from the outside, based on a sensing signal of a second touch sensing unit formed on the second pixel group during the third period.

The first touch sensing unit may include a first electrode corresponding to the first light emitting group and formed on the first pixel group in a first direction and a plurality of second electrodes formed in a second direction, and the second touch sensing unit may include a third electrode corresponding to the second light emitting group and formed on the second pixel group in the first direction and the plurality of second electrodes.

The first electrode may be cathode electrodes of the plurality of OLEDs of the first pixel group and the second electrode may be cathode electrodes of the plurality of OLEDs of the second pixel group.

The cathode electrodes of the plurality of OLEDs of the first and second pixel groups each may be formed of a single electrode.

The applying during the first period may include selectively applying a plurality of first scan signals through a plurality of first scan lines each connected to the first pixel groups and the applying during the third period may include selectively applying a plurality of second scan signals through a plurality of second scan lines each connected to the second pixel groups.

The determining of the touch during the first period may include: using the plurality of first scan signals to generate a first touch scan signal; and applying the first touch scan signal to the first electrode, and the determining of the touch during the third period may include: using the plurality of second scan signals to generate a second touch scan signal; and applying the second touch scan signal to the third electrode.

The first and second touch scan signals may have reference voltage.

The first and second touch scan signals may each alternately have reference voltage and voltage lower than the reference voltage.

The generating of the first touch scan signal may include: outputting the reference voltage to the first electrode in response to each of the plurality of first scan signals during the first period; and outputting the voltage lower than the reference voltage to the first electrode in response to the second voltage level of light emitting signal during the second period, and the generating of the second touch scan signal may include: outputting the reference voltage to the third electrode in response to each of the plurality of second scan signals during the third period; and outputting the voltage lower than the reference voltage to the third electrode in response to the second voltage level of light emitting signal during the fourth period.

The applying during the first period may include selectively applying a plurality of first scan signals and a plurality of second scan signals through the plurality of first scan lines and the plurality of second scan lines each connected to the first pixel group, and the applying during the third period may include selectively applying a plurality of third scan signals and a plurality of fourth scan signals through the plurality of third scan lines and the plurality of fourth scan lines each connected to the second pixel group.

The selectively applying of the plurality of first scan signals and the plurality of second scan signals may include applying first scan signals corresponding to each of the plurality of pixels of the first pixel group and then applying the corresponding second scan signals and the selectively applying of the plurality of third scan signals and the plurality of fourth scan signals may include applying third scan signals corresponding to each of the plurality of pixels of the second pixel group and then applying the corresponding fourth scan signals.

Yet another exemplary embodiment of the present invention provides a driving method of a display device displaying an image through a plurality of pixels including organic light emitting diodes (OLEDs). The driving method includes: dividing the plurality of pixels into a plurality of light emitting groups; applying a plurality of touch scan signals to a plurality of first electrodes formed on the plurality of pixels in a first direction in response to each of the plurality of light emitting groups, during a non-light emitting period of each of the plurality of light emitting groups; outputting, as a sensing signal, a magnitude in voltage between a plurality of second electrodes formed on the plurality of first electrodes in a second direction having an insulating layer therebetween and the plurality of first electrodes by a touch from the outside; and determining a touched position from the sensing signal.

The driving method of a display device may further include: transferring current in response to a plurality of data voltages corresponding to an image signal to the OLED of the corresponding light emitting group during a light emitting period of each of the plurality of light emitting groups. The driving method of a display device may further include: applying a plurality of light emitting signals controlling a light emitting period and a non-light emitting period of each of the plurality of light emitting groups to the plurality of light emitting groups.

The driving method of a display device may further include: selectively applying a plurality of scan signals to a plurality of scan lines connected to each of the plurality of pixels of the corresponding light emitting group during the non-light emitting period of each of the plurality of light emitting groups.

The driving method of a display device may further include: generating a touch scan signal to be applied to the corresponding first electrode using the plurality of scan signals applied to the plurality of scan lines connected to each of the plurality of pixels of the corresponding light emitting group during the non-light emitting period of each of the plurality of light emitting groups.

Each of the plurality of first electrodes may be cathode electrodes of the plurality of organic light emitting diodes of the plurality of light emitting groups.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
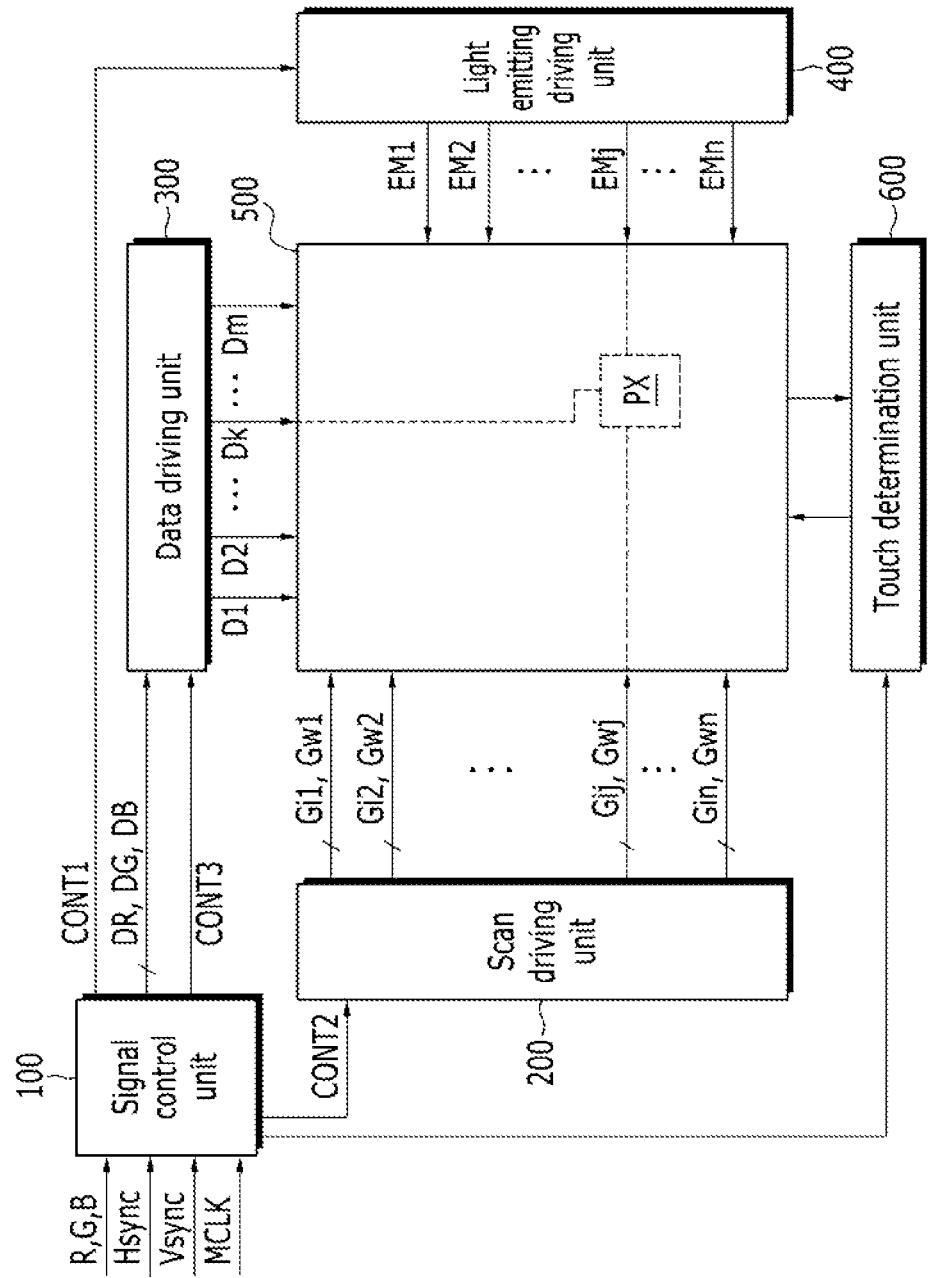
FIG. 1 is a diagram illustrating a display device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive Like reference numerals designate like elements throughout the specification.

In the specification and claims, unless explicitly described to the contrary, the word "comprise" and variations such as "comprises" or "comprising", will be understood to imply the inclusion of stated elements but not the exclusion of any other elements.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements.

Hereinafter, a display device and a driving method thereof according to an exemplary embodiment of the present invention will be described in detail with reference to the accompanying drawings.

FIG. 1 is a diagram illustrating a display device according to an exemplary embodiment of the present invention.

Referring to FIG. 1, an organic light emitting diode (OLED) display according to an exemplary embodiment of the present invention includes a control unit 100, a scan driving unit 200, a data driving unit 300, a light emitting driving unit 400, and a display unit 500. Further, the OLED display further includes a touch sensing unit 600.

The control unit 100 receives input control signals which control external video signals R, G, and B input from external devices and a display thereof. The external video signals R, G, and B include luminance information of each pixel (PXs), in which the luminance information includes data instructing a gray scale of the corresponding pixel among the defined number, for example, 1024=210, 256=28 or 64=26 of gray scales. As the input control signal, there are a vertical synchronization signal Vsync, a horizontal synchronization signal Hsync, a main clock MCLK, and the like.

The control unit 100 appropriately processes the external video signals R, G, and B based on the input control signals to meet operation conditions of a display unit 400 and a data driving unit 300 and generates a light emitting control signal CONT1, a scan control signal CONT2, a data control signal CONT3, and image data signals DR, DG, and DB.

The control unit 100 divides the external video signals R, G, and B in a frame unit in response to the vertical synchronization signal Vsync and divides the external video signals R, G, and B in a unit of scan lines Gi1 to Gin and Gw1 to Gwn in response to the horizontal synchronization signal Hsync to generate the image data signals DR, DG, and DB. The control unit 100 transfers the scan control signal CONT2 to the scan driving unit 200 and transfers the data control signal CONT3 and the image data signals DR, DG, and DB to the data driving unit 300.

The scan driving unit 200 generates a plurality of scan signals and applies the scan signals to the plurality of scan lines Gi1 to Gin and Gw1 to Gwn, respectively, in response to the scan control signal CONT2.

The data driving unit 300 transfers the plurality of data signals corresponding to the image data signals DR, DG, and DB to a plurality of data lines D1 to Dm, respectively, in response to the data control signal CONT3.

The light emitting driving unit 400 generates and transfers a plurality of light emitting signals to a plurality of light emitting control lines EM1 to EMn in response to the light emitting control signal CONT1.

The display unit 500 includes the plurality of data lines D1 to Dm extending in a column direction, the plurality of scan lines Gi1 to Gin and Gw1 to Gwn extending in a row direction, the plurality of light emitting control lines EM1 to EMn, and the plurality of pixels (PXs). The plurality of data lines D1 to Dm, the plurality of scan lines Gi1 to Gin and Gw1 to Gwn, and the light emitting control lines EM1 to EMn are connected to the plurality of pixels PXs.

Further, the display unit 500 may further include a plurality of signal lines (not shown) for sensing a touch and a touch sensing unit (not shown) which is connected to the plurality of signal lines and formed on the plurality of pixels PXs. The touch sensing unit transfers a plurality of sensing signals to the touch determination unit 600 through the plurality of signal lines.

The plurality of pixels PXs may each display any one of red (R), green (G), and blue (B). The plurality of data lines D1 to Dm each transfer the data voltage corresponding to the image data signals DR, DG, and DB to the plurality of pixels PXs and the plurality of scan lines Gi1 to Gin and Gw1 to Gwn transfer the scan signals to the pixels PXs for selecting rows of pixels PXs. The plurality of light emitting control lines EM1 to EMn transfer, to the plurality of pixels PXs, the plurality of light emitting signals for controlling the emission of the plurality of pixels PXs.

The touch determination unit 600 receives the plurality of sensing signals from the touch sensing unit and determines touched positions of the display unit 500 from the received sensing signals.

Figure 2:
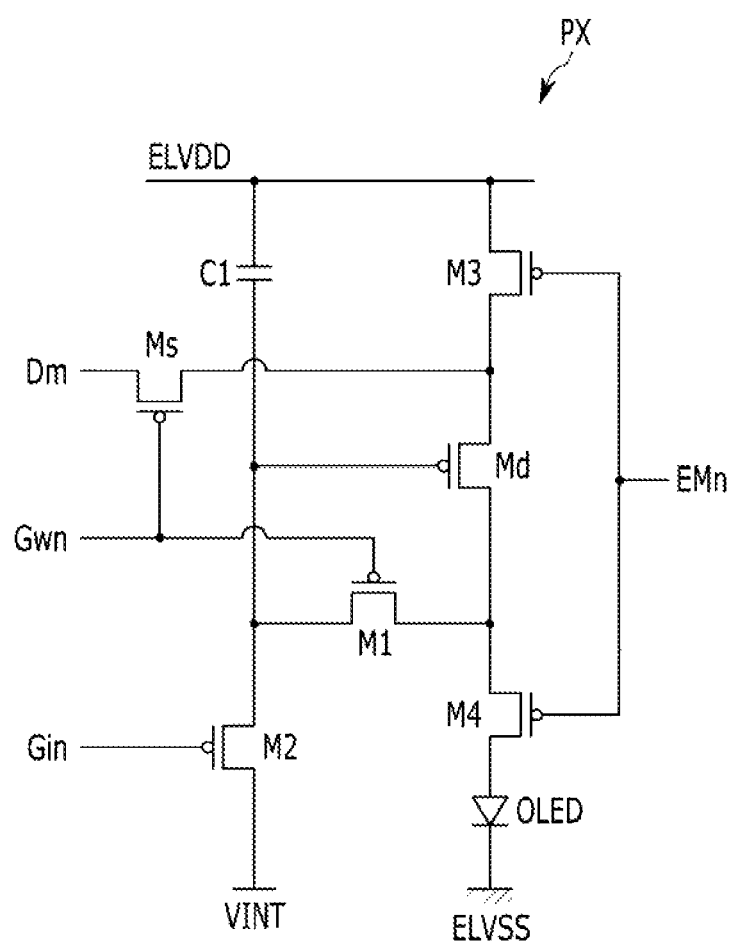
FIG. 2 is a diagram illustrating an example of one of a plurality of pixels according to the exemplary embodiment of the present invention.

FIG. 2 is a diagram illustrating an example of one of a plurality of pixels according to the exemplary embodiment of the present invention.

Referring to FIG. 2, one pixel PX according to the exemplary embodiment of the present invention is connected to n-th scan lines Gin and Gwn, an n-th light emitting control line EMn, and an m-th data line Dm.

The pixel PX includes a switching transistor Ms, a driving transistor Md, a plurality of transistors M1 to M4, a capacitor C1, and an organic light emitting diode OLED. FIG. 2 illustrates that the transistors Ms, Md, and M1 to M4 are a p-channel metal oxide semiconductor (PMOS) transistor which is a p-channel type of transistor, but instead of the PMOS transistor, another transistor performing a similar function may also be used.

Switching transistor Ms includes a gate electrode connected to the scan line Gwn, a source electrode connected to the data line Dm, and a drain electrode connected to a source electrode of the driving transistor Md. The switching transistor Ms is turned on by the scan signal applied to the scan line Gwn to transfer the data voltage, applied to the data line Dm, to the source electrode of the driving transistor Md.

Driving transistor Md includes a source electrode to which the data voltage is transferred for a period in which the switching transistor Ms is turned on, a gate electrode connected to a first electrode of the capacitor C1, and a drain electrode connected to a source of the transistor M4. A second electrode of the capacitor C1 is connected to a voltage source which applies power supply voltage ELVDD.

Transistor M1 includes a gate electrode connected to the scan line Gwn, a source electrode connected to the gate electrode of the driving transistor Md, and a drain electrode connected to the drain electrode of the driving transistor Md. The transistor M1 is turned on by the scan signal applied to the scan line Gwn to diode-connect the driving transistor Md.

Transistor M2 includes a gate electrode connected to the scan line Gin, a source electrode connected to a voltage source supplying initialization voltage VINT, and a drain electrode connected to the gate of the driving transistor Md.

Transistor M3 includes a gate electrode connected to the light emitting control line EMn, a source electrode connected to the voltage source supplying the voltage ELVDD, and a drain electrode connected to the source of the driving transistor Md.

Transistor M4 includes a gate electrode connected to the light emitting control line EMn, a source electrode connected to the drain electrode of the driving transistor Md, and a drain electrode connected to an anode of the OLED. A cathode electrode of the OLED is connected to the voltage source supplying voltage ELVSS. When the transistors M3 and M4 are turned on by the light emitting signal, the OLED emits light in response to current flowing through the driving transistor Md to display images.

Figure 3:
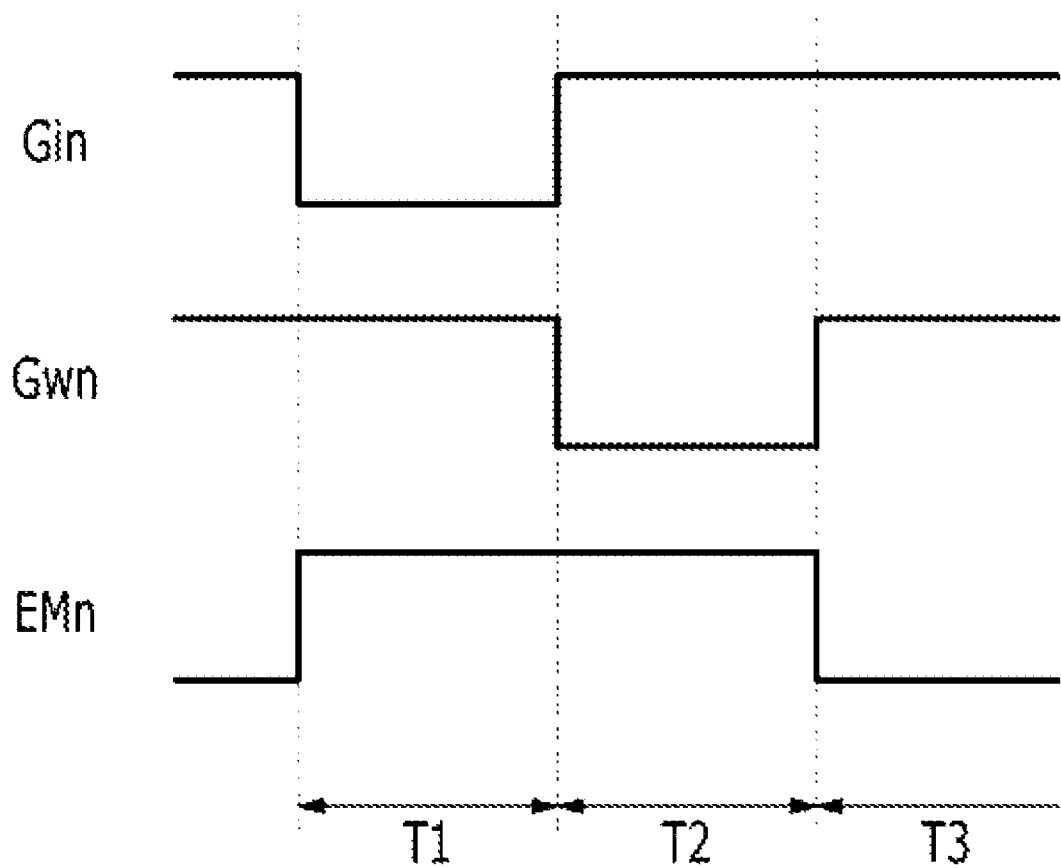
FIGS. 3 and 4 each are diagrams illustrating a driving timing for describing an operation of the pixel illustrated in FIG. 2.
Figure 4:
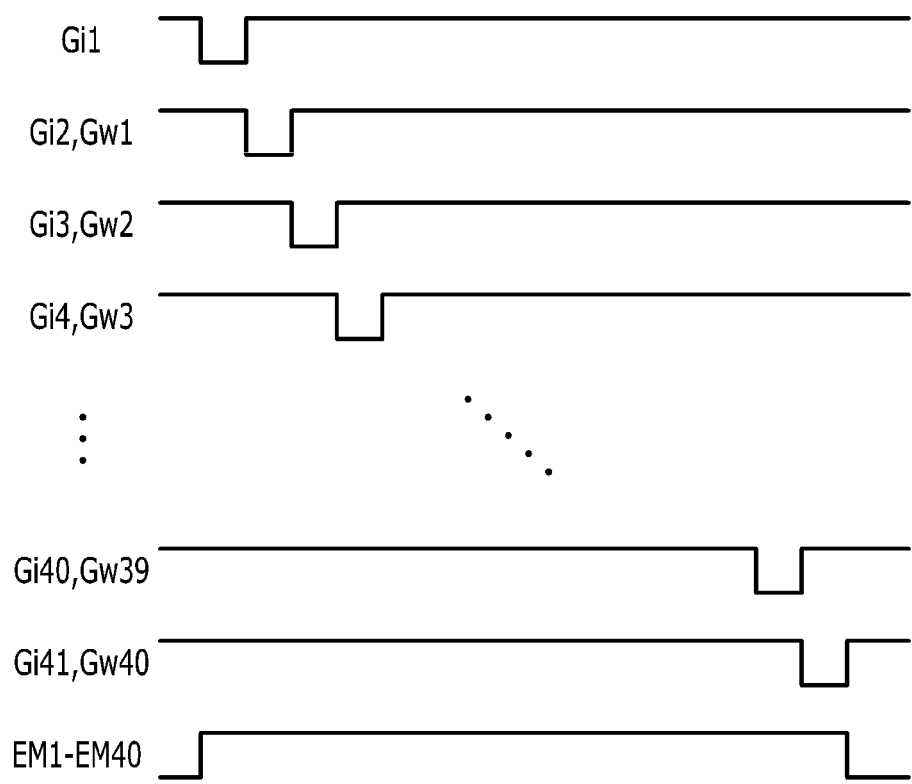

FIGS. 3 and 4 each are diagrams illustrating a driving timing for describing an operation of the pixel illustrated in FIG. 2.

Referring to FIG. 3, a low level of scan signal is applied to the scan line Gin for a period T1. In this case, the transistor M2 is turned on to apply the initialization voltage VINT to the gate electrode of the driving transistor Md and the capacitor C1 keeps ELVDD-VINT voltage.

Next, the low level of scan signal is applied to the scan line Gwn for a period T2. In this case, the switching transistor Ms and the transistor M1 are turned on. First, when the transistor M1 is turned on, the driving transistor Md is in a diode-connection state. Therefore, gate-source voltage of the transistor Md becomes the threshold voltage of the transistor Md.

Further, when the switching transistor Ms is turned on, the data voltage from the data line Dm is applied to the source electrode of the driving transistor Md. When the data voltage from the data line Dm is Vdata and the threshold voltage of the driving transistor Md is Vth (negative voltage), the gate voltage of the driving transistor Md becomes Vdata+Vth.

Next, the low level of light emitting signal is applied to the light emitting control line EMn for a period T3. In this case, the transistors M3 and M4 are turned on, and thus the gate-source voltage of the transistor Md depends on Equation 1.

$$Vgs = (Vdata + Vt) - ELVDD \qquad \text{Equation 1}$$

In the above Equation 1, Vgs is the gate-source voltage of the transistor Md, Vth is the threshold voltage of the transistor Md, and Vdata is the data voltage transferred from the data line Dm.

In this case, current flows in the OLED through the transistor Md and a value of current flowing in the OLED depends on Equation 2.

$$I_{OLED} = \frac{\beta}{2}(Vgs = Vth)^2 = \qquad \text{Equation 2}$$

$$\frac{\beta}{2}((Vdata + Vth - ELVDD) - Vth)^2 = \frac{\beta}{2}(Vdata - ELVDD)^2$$

In the above Equation 2, $I_{OLED}$ represents the current flowing in the OLED and β is a constant value.

Generally, deviations in threshold voltage of the thin film transistors for each pixel PX occur due to uniformity of a manufacturing process, such that the amount of current supplied to the OLED may be changed and the emission luminance may be changed. However, according to the exemplary embodiment of the present invention, even though the threshold voltages of the driving transistor Md located at each pixel PX are different as can be appreciated from the above Equation 2, the effect of the threshold voltage may be excluded, such that constant current may be supplied to the OLED. Therefore, a luminance unbalance problem due to the position of the pixel PX may be solved.

Meanwhile, the light emitting driving unit 400 may independently control the plurality of light emitting control lines EM1 to EMn, but unlike this, the plurality of light emitting control lines EM1 to EMn are divided into a plurality of light emitting groups, such that the light emitting control lines of each light emitting group may be simultaneously controlled. For example, 40 light emitting control lines may be controlled by a single light emitting signal.

Referring to FIG. 4, when first to 40-th light emitting control lines EM1 to EM40 form a single light emitting group, the scan signals are sequentially applied to first to 40-th scan lines Gi1 to Gi40 and Gw1 to Gw40, respectively.

FIG. 4 illustrates a waveform of the scan signals supplied from the scan line Gi1 to the scan line Gi41. As illustrated in FIG. 3, a phase difference by the period T1 is required between the scan signals supplied to the scan lines Gi and Gw.

For example, when the period T1 is a period corresponding to one horizontal period, the scan signal supplied to a k+1-th scan line Gi may be a scan signal supplied to a k-th scan line Gw. Therefore, in the waveform illustrated in FIG. 4, the scan signals supplied to the scan lines Gi2, Gi3, Gi4, Gi40 and Gi41 may be used as the scan signals supplied to the scan lines Gw1, Gw2, Gw3, Gw39 and Gw40.

However, the exemplary embodiment of the present invention is not limited thereto, but there may be a phase difference corresponding to at least two horizontal periods between the scan signals supplied to the neighboring scan lines Gi. Similarly, there may also be a phase difference corresponding to at least two horizontal periods between the scan signals supplied to the neighboring scan lines Gw.

High-level light emitting signals are applied to first to 40-th light emitting control lines EM1 to EM40 while the scan signals are sequentially applied to the first to 40-th scan lines Gi1 to Gi40 and Gw1 to Gw40, respectively, and then low level light emitting signals are simultaneously applied to the first to 40-th light emitting control lines EM1 to EM40. In this case, 40 rows of pixels PXs simultaneously emit light. By doing so, the line between the light emitting driving unit 400 and the pixel PX may be simplified, as compared with the driving method of FIG. 3.

Figure 5:
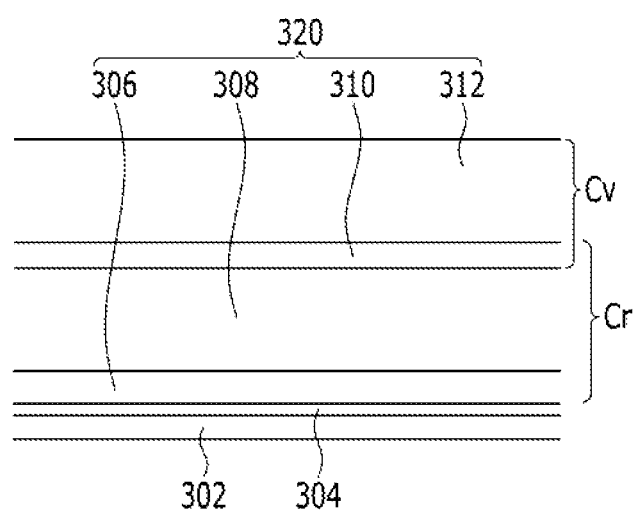
FIG. 5 is a partial cross-sectional view of an organic light emitting diode (OLED) of one pixel according to the exemplary embodiment of the present invention.
Figure 6:
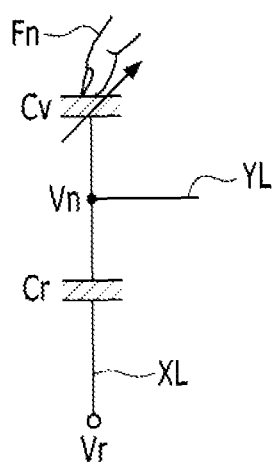
FIG. 6 is an equivalent circuit diagram of a touch sensing unit according to an exemplary embodiment of the present invention.

FIG. 5 is a partial cross-sectional view of an organic light emitting diode (OLED) of one pixel according to the exemplary embodiment of the present invention and FIG. 6 is an equivalent circuit diagram of a touch sensing unit according to an exemplary embodiment of the present invention.

Referring to FIG. 5, an organic light emitting member 304 is formed on an anode electrode 302 and a cathode electrode 306 is formed on the organic light emitting member 304. The anode electrode 302, the organic light emitting member 304, and the cathode electrode 306 form an organic light emitting diode (OLED). The power supply voltage ELVSS is applied to the cathode electrode 306 through a cathode line (not shown). In this case, positions of the anode electrode 302 and the cathode electrode 306 may be changed to each other.

An insulating layer 308 is formed on the cathode electrode 306, a transparent electrode 310 is formed on the insulating layer 308, and a surface insulating layer 312 is formed on the transparent electrode 310. According to the exemplary embodiment of the present invention, the cathode electrode 306, the insulating layer 308, the transparent electrode 310, and the surface insulating layer 312 form a touch sensing unit 320 comprising a reference capacitor Cr and a variable capacitor Cv. Although not shown, the transparent electrode 310 is connected to the touch determination unit 600 through a signal line. That is, the cathode line connected to the cathode electrode 306 and the signal line connected to the transparent electrode 310 are each used as an X-axis line and a Y-axis line to determine the touched position, as discussed with respect to FIG. 6.

Referring to FIG. 6, the touch sensing unit 320 includes the variable capacitor Cv connected to the Y-axis line YL and the reference capacitor Cr connected between the variable capacitor Cv and a terminal to which reference voltage Vr is applied. The reference voltage Vr is applied through the X-axis line XL.

Capacitance of the variable capacitor Cv may have a value changed according to external stimuli, such as a touch of a user's finger, or a small tool (such as a stylus), which is applied to an upper terminal of the variable capacitor Cv. An example of the external stimuli may include pressure. When the capacitance of the variable capacitor Cv is changed, a magnitude of contact voltage Vn between the reference capacitor Cr and the variable capacitor Cv is changed. The contact voltage Vn is a sensing signal and flows through the Y-axis line YL and the touch determination unit 600 may determine the touch and the touched position based on the voltage Vn. In this case, the reference capacitor Cr has fixed capacitance and the reference voltage Vr applied to the reference capacitor Cr has a constant voltage value and therefore the contact voltage Vn is changed within a constant range. Therefore, the contact voltage Vn may have a voltage level of the constant range at all times, such that the touch and the touched position may be easily determined.

Figure 7:
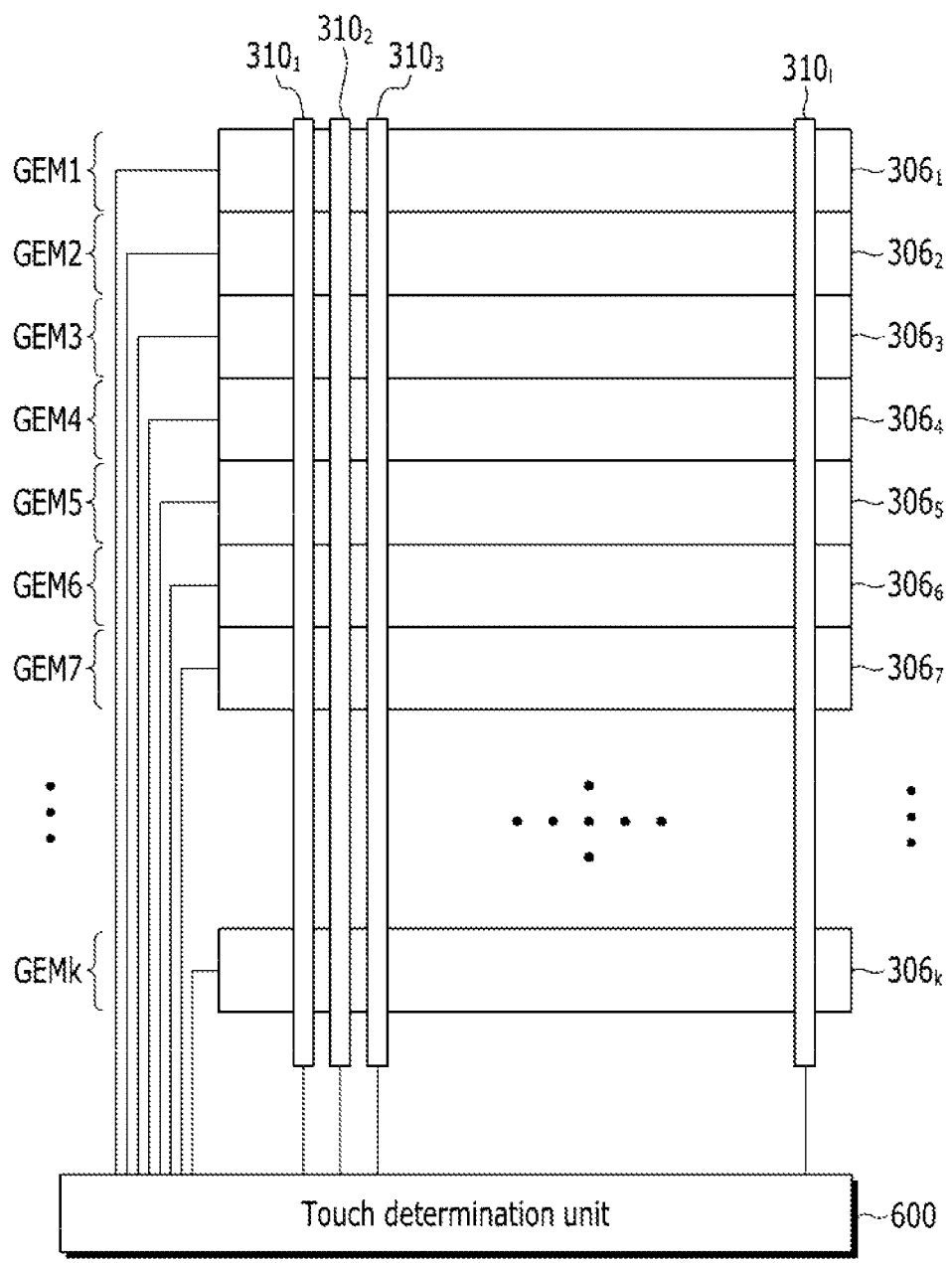
FIG. 7 is a diagram illustrating an example of a line formed to sense a touch according to an exemplary embodiment of the present invention.

FIG. 7 is a diagram illustrating an example of a line formed to sense a touch according to an exemplary embodiment of the present invention.

Referring to FIG. 7, a cathode electrode layer may include a plurality of cathode electrodes 306i to 306k that are patterned in a row direction in response to the plurality of pixels PXs.

One patterned cathode electrode 306i may be formed on the organic light emitting members (304, FIG. 5) of a plurality of rows (for example, 40 rows). Further, the plurality of light emitting control lines (EM1 to EMn) are divided into a plurality of light emitting groups GEM1 to GEMk connected to the touch determination unit 600, wherein one light emitting group GEMi may include the plurality of light emitting control lines (for example, 40 light emitting control lines).

By doing so, the power supply voltage ELVSS is applied to the plurality of rows (for example, 40 rows) of pixels through a single cathode line, such that the number of cathode lines may be reduced, as compared with the case in which the cathode lines are connected corresponding to each row of pixels. For example, in the case in which the display unit 500 is configured of 1,280 rows of pixels, when the independent cathode line is connected to each pixel of each row, 1,280 cathode lines are required, but when a single cathode line is connected to 40 rows of pixels, only 32 cathode lines are required, and therefore the number of cathode lines may be remarkably reduced. That is, the number of X-axis lines for sensing a touch may be reduced.

Further, the insulating layer (not shown) is formed on the plurality of patterned cathode electrodes $306_1$ to $306_k$ and the transparent electrode layer is formed on the insulating layer. The transparent electrode layer includes a plurality of transparent electrodes $310_1$ to $310_l$ that are patterned in a column direction. Each of the plurality of transparent electrodes $310_1$ to $310_l$ transfers the sensing signal to the touch determination unit 600 through the Y-axis line.

Figure 8:
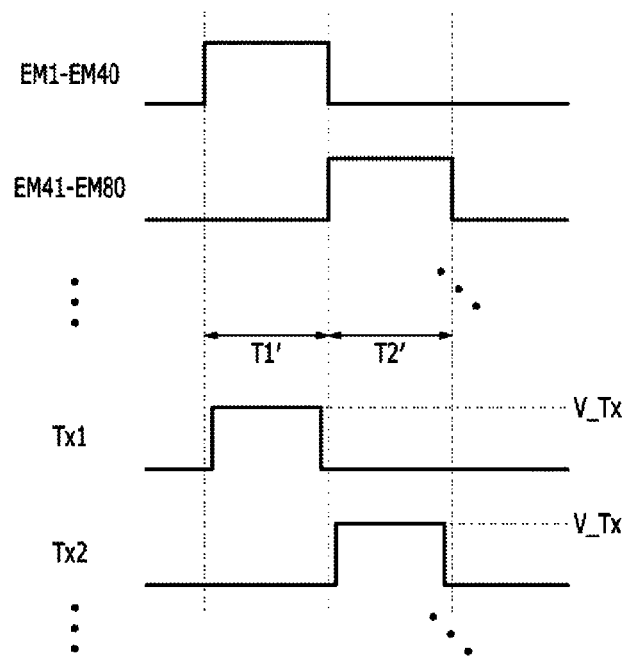
FIGS. 8 and 9 each are diagrams illustrating a driving waveform of the pixel for describing a touch sensing method of the display device illustrated in FIG. 7.
Figure 9:
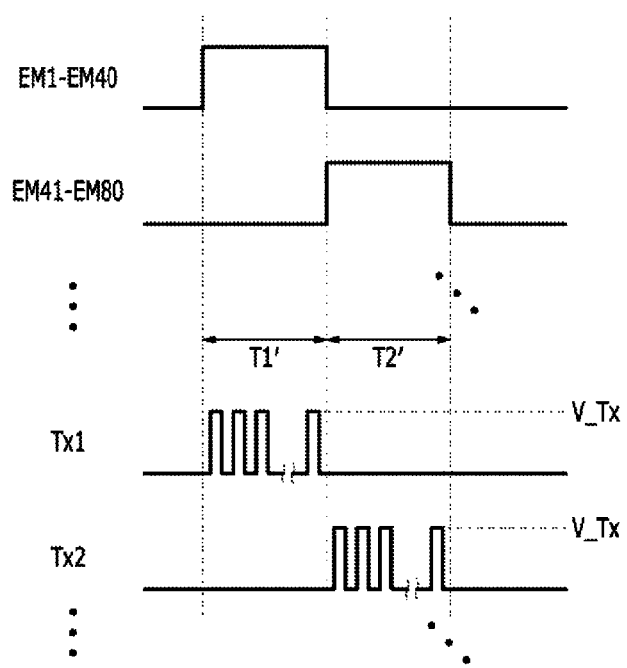

FIGS. 8 and 9 each are drawings illustrating a driving waveform of a pixel for describing a touch sensing method of the display device illustrated in FIG. 7 and for convenience of explanation, illustrate that one cathode electrode and one light emitting signal correspond to 40 rows of pixels PXs.

Referring to FIG. 8, touch determination unit 600 applies a high level (V_Tx) of touch scan signal Tx1 to a cathode electrode $306_1$ through the X-axis line during a period T1' in which a high level of light emitting signal is applied to the first to 40-th light emitting control lines EM1 to EM40. The high level V_Tx of touch scan signal Tx1 may be a voltage higher than the power supply voltage ELVSS and the low level of touch scan signal Tx1 may be the power supply voltage ELVSS. In this case, when the external stimuli occur by a finger in the state in which the voltage V_Tx is applied to the cathode electrode $306_1$ corresponding to 40 rows of pixels, the voltage of the corresponding position is changed and the changed voltage is transferred to the touch determination unit 600 through the Y-axis line as the sensing signal.

In this case, since the high level of light emitting signal is applied to the light emitting control lines EM1 to EM40, even though the voltage applied to the cathode electrode $306_1$ is changed from the power supply voltage ELVSS to the voltage V_Tx, no current flowing in the organic light emitting diode OLED is changed. Therefore, the luminance of the image is not changed.

Next, the touch determination unit 600 applies a high level (V_Tx) of touch scan signal Tx2 to a cathode electrode $306_2$ through the Y-axis line during a period T2' in which the high level of light emitting signal is applied to 41-th to 80-th light emitting control lines EM41 to EM80. In this case, the touched positions at pixel positions of 41-th to 80-th rows may be sensed by the same method as the foregoing method.

In this way, the touch determination unit 600 may determine the touch positions at all the positions of the display unit 500.

Meanwhile, the touch determination unit 600 may also generate the touch scan signals Tx1, Tx2, . . . which periodically have the high level V_Tx and the low level ELVSS over time as illustrated in FIG. 9.

In this case, a method of applying the touch scan signals to a plurality of patterned cathode electrodes $306_1$ to $306_k$ will be described in detail with reference to FIGS. 10 to 13.

Figure 10:
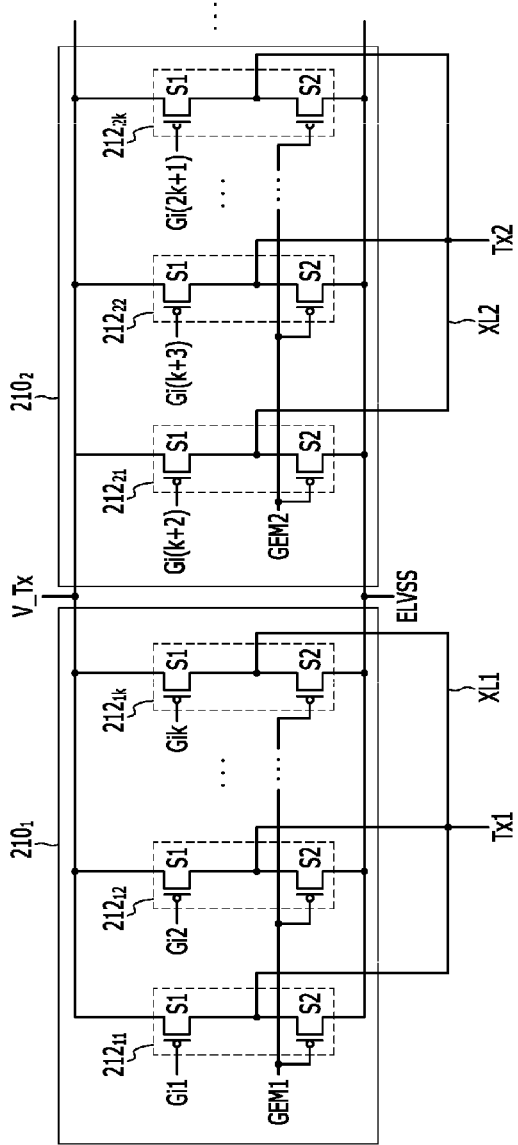
FIG. 10 is a diagram illustrating an example of a touch determination unit according to an exemplary embodiment of the present invention.
Figure 11:
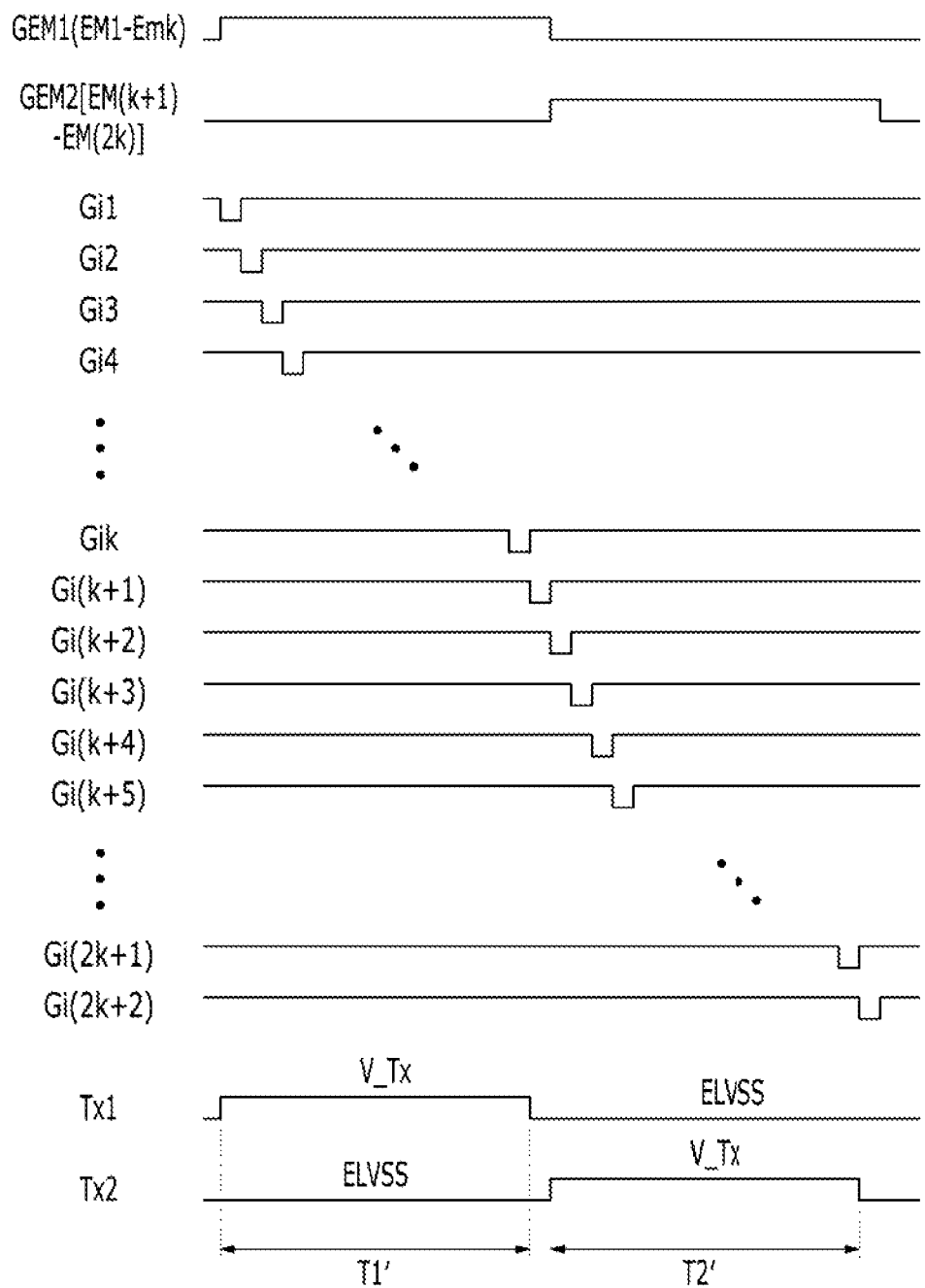
FIG. 11 is a diagram illustrating a touch scan signal generated from the touch determination unit illustrated in FIG. 10.

FIG. 10 is a diagram illustrating an example of the touch determination unit according to an exemplary embodiment of the present invention and FIG. 11 is a diagram illustrating the touch scan signal generated from the touch determination unit illustrated in FIG. 10. For convenience of explanation, FIGS. 10 and 11 each illustrate the two light emitting groups GEM1 and GEM2 each corresponding to pixels of a k-th row and only the touch scan signals Tx1 and Tx2 applied to the two patterned cathode electrodes $306_1$ and $306_2$.

Referring to FIG. 10, the touch determination unit 600 includes a plurality of signal generation units $210_1$ and $210_2$ which generate the touch scan signals Tx1 and Tx2 each corresponding to the patterned cathode electrodes $306_1$ and $306_2$.

The signal generation unit $210_1$ includes a plurality of signal controllers $212_{11}$ to $212_{1k}$ which generate the touch scan signal Tx1 corresponding to the patterned cathode electrode $306_1$. The signal generation unit $210_2$ includes a plurality of signal controllers $212_{21}$ to $212_{2k}$ which generate the touch scan signal Tx2 corresponding to the patterned cathode electrode $306_2$.

The signal controllers $212_{11}$ to $212_{1k}$ and $212_{21}$ to $212_{2k}$ each include two transistors S1 and S2. The scan signals applied to scan lines Gi1 to Gik and Gi(k+2) to Gi(2k+1) are sequentially applied to gate electrodes of each transistor S1 of the signal $212_{11}$ to $212_{1k}$ and $212_{21}$ to $212_{2k}$ (when the touch scan signals are generated, the scan line (Gi(k+1) of FIG. 11 is not used), and the light emitting signals of the corresponding light emitting groups GEM1 and GEM2 are applied to gate electrodes of each transistor S2 of the signal controllers $212_{11}$ to $212_{1k}$ and $212_{21}$ to $212_{2k}$. The voltage V_Tx is applied to source electrodes of the transistors S1 of the signal controllers $212_{11}$ to $212_{1k}$ and $212_{21}$ to $212_{2k}$ and the power supply voltage ELVSS is applied to source electrodes of the transistors S2 of the signal controllers $212_{11}$ to $212_{1k}$ and $212_{21}$ to $212_{2k}$. Further, drain electrodes of the transistors S1 and S2 of the signal controllers $212_{11}$ to $212_{1k}$ are output terminals of the signal controllers $212_{11}$ to $212_{1k}$, and are connected to the patterned cathode electrode $306_1$ through a single cathode line, that is, an X-axis line XL1. The drain electrodes of the transistors S1 and S2 of the signal controllers $212_{21}$ to $212_{2k}$ are also output terminals of the signal controllers $212_{21}$ to $212_{2k}$, and are connected to the patterned cathode electrode $306_2$ through a single X-axis line XL2. In this way, cathode electrodes $306_3$ to $306_k$ are connected to the output terminals of corresponding signal controllers through each cathode line.

Referring to FIG. 11, the signal generation unit $210_1$ sequentially applies the low level of scan signals applied to the scan lines Gi1 to Gik to gates of each transistor S1 of the signal controllers $212_{11}$ to $212_{1k}$ during the period T1' in which the high level of light emitting signals are applied to the transistors S2 via the first to k-th light emitting control lines EM1 to EMk of the light emitting group GEM1. In this case, each transistor S1 of the signal controllers $212_{11}$ to $212_{1k}$ is sequentially turned on to output the voltage V_Tx during the period T1'. Afterwards, the low level of light emitting signals are applied to the transistors S2 via the first to k-th light emitting control lines EM1 to EMk of the light emitting group GEM1 of the signal controller $212_{11}$ to $212_{1k}$, thus the transistors S2 are simultaneously turned on to output the power supply voltage ELVSS. That is, the signal generation unit $210_1$ may generate the touch scan signal Tx1 having the voltage V_Tx during the period T1'. The generated scan touch signal Tx1 is applied to the patterned cathode electrode $306_1$ through the X-axis line XL1.

Next, the signal generation unit $210_2$ sequentially applies the low level of scan signals applied to the signal lines Gi(k+2) to Gi(2k+1) to the gates of each transistor S1 of the signal controllers $212_{21}$ to $212_{2k}$ during the period T2' in which the high level of light emitting signals are applied to the transistors S2 via the k+1-th to 2k-th light emitting control lines EM(k+1) to EM(2k) of the light emitting group GEM2. In this case, each transistor S1 of the signal controllers $212_{21}$ to $212_{2k}$ is sequentially turned on to output the voltage V_Tx during the period T2'. Afterwards, the low level of light emitting signals are applied to the transistors S2 via the k+1-th to 2k-th light emitting control lines EM(k+1) to EM(2k) of the light emitting group GEM2, thus transistors S2 of the signal controller $212_{21}$ to $212_{2k}$ are simultaneously turned on to output the power supply voltage ELVSS. That is, the signal generation unit $210_2$ may generate the touch scan signal Tx2 having the voltage V_Tx during the period T2'. The generated scan touch signal Tx2 is applied to the patterned cathode electrode $306_2$ through the X-axis line XL2.

In this way, the touch determination unit 600 may transfer the touch scan signals to the cathode electrodes $306_1$ to $306_k$ of all the pixels.

Figure 12:
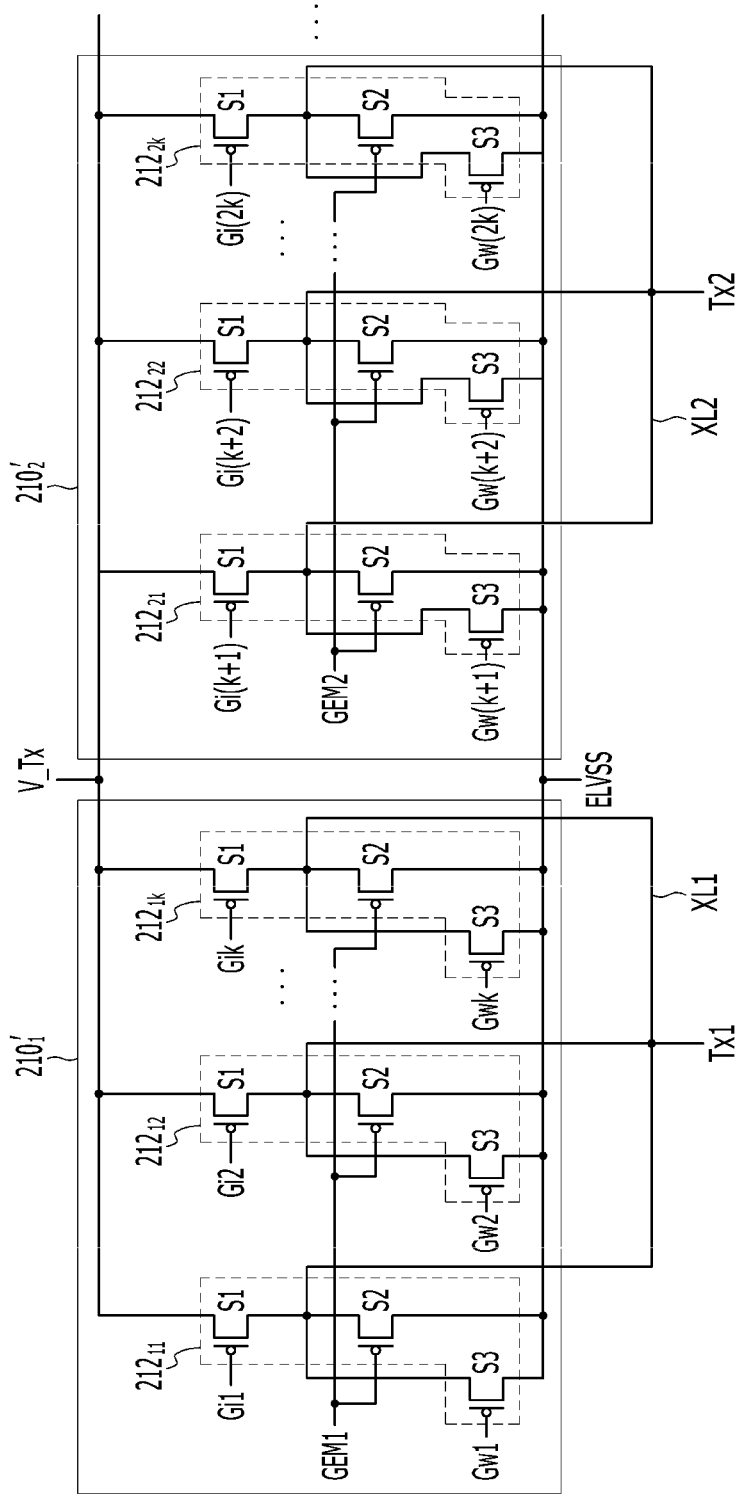
FIG. 12 is a diagram illustrating another example of a touch determination unit according to an exemplary embodiment of the present invention.
Figure 13:
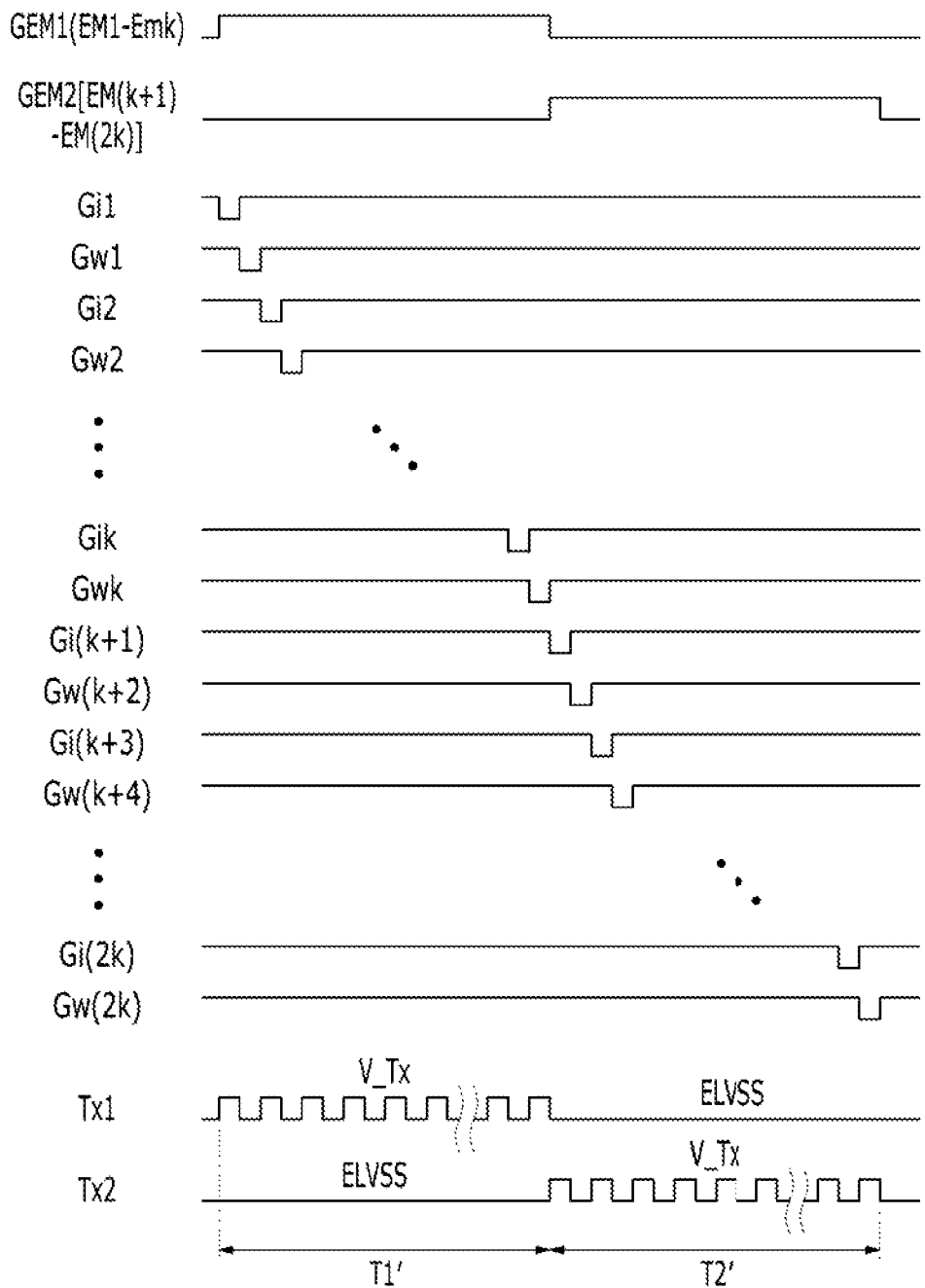
FIG. 13 is a diagram illustrating the touch scan signal generated from the touch determination unit illustrated in FIG. 12.

FIG. 12 is a diagram illustrating another example of a touch determination unit according to an exemplary embodiment of the present invention and FIG. 13 is a diagram illustrating the touch scan signal generated from the touch determination unit illustrated in FIG. 12. For convenience of explanation, FIGS. 12 and 13 each illustrate the two light emitting groups GEM1 and GEM2 each corresponding to pixels of a k-th row and only the touch scan signals Tx1 and Tx2 applied to the two patterned cathode electrodes $306_1$ and $306_2$.

Referring to FIG. 12, the touch determination unit 600 includes a plurality of signal generation units $210_1'$ and $210_2'$ which generate the touch scan signals Tx1 and Tx2 each corresponding to the patterned cathode electrodes $306_1$ and $306_2$.

The signal generation unit $210_1'$ includes the plurality of signal controllers $212_{11}$ to $212_{1k}$ which generate the touch scan signal Tx1 corresponding to the patterned cathode electrode $306_1$ and the signal generation unit $210_2'$ includes the plurality of signal controllers $212_{21}$ to $212_{2k}$ which generate the touch scan signal Tx2 corresponding to the patterned cathode electrode $306_2$.

The signal controllers $212_{11}$ to $212_{1k}$ and $212_{21}$ to $212_{2k}$ each include transistors S1 to S3.

The scan signals applied to the scan lines Gi1 to Gi(2k) are sequentially applied to the gate electrodes of the plurality of transistors S1 of the signal controllers $212_{11}$ to $212_{1k}$ and $212_{21}$ to $212_{2k}$ and the scan signals applied to the scan lines Gw1 to Gw(2k) are sequentially applied to the gate electrodes of the plurality of transistors S3 of the signal controllers $212_{11}$ to $212_{1k}$ and $212_{21}$ to $212_{2k}$. The light emitting signals of the corresponding light emitting groups GEM1 and GEM2 are applied to the gate electrodes of each transistor S2 of the signal controllers $212_{11}$ to $212_{1k}$ and $212_{21}$ to $212_{2k}$. The voltage V_Tx is applied to source electrodes of the transistor S1 of the signal controllers $212_{11}$ to $212_{1k}$ and $212_{21}$ to $212_{2k}$ and the power supply voltage ELVSS is applied to source electrodes of the transistors S2 and S3 of the signal controllers $212_{11}$ to $212_{1k}$ and $212_{21}$ to $212_{2k}$. The drain electrodes of the transistors S1 and S2 of the signal controllers $212_{11}$ to $212_{1k}$ are the output terminals of the signal controllers $212_{11}$ to $212_{1k}$, and are connected to the patterned cathode electrode $306_1$ through the single X-axis line XL1. The drain electrodes of the transistors S1 and S2 of the signal controllers $212_{21}$ to $212_{2k}$ are also output terminals of the signal controllers $212_{21}$ to $212_{2k}$, and are connected to the patterned cathode electrode $306_2$ through a single X-axis line XL2.

In this way, the patterned cathode electrodes $306_3$ to $306_k$ are connected to the output terminals of corresponding signal controllers through each cathode line.

Referring to FIG. 13, the signal generation unit $210_1'$ sequentially applies the low level of scan signals applied to the scan lines Gi1 to Gik and Gw1 to Gwk to the gates of each transistor S1 and S3 of the signal controllers $212_{11}$ to $212_{1k}$ during the period T1' in which the high level of light emitting signals are applied to the first to k-th light emitting control lines EM1 to EMk of the light emitting group GEM1. In this case, the transistors S1 and S3 of the signal controllers $212_{11}$ to $212_{1k}$ are sequentially turned on in response to each of the scan signals applied to the scan lines Gi1 to Gik and Gw1 to Gwk during the period T1' to alternately output the voltage V_Tx and the power supply voltage ELVSS.

Further, since the low level of light emitting signals are applied to the first to k-th light emitting control lines EM1 to EMk of the light emitting group GEM1 during the period (for example, T2'), not during the period T1', the transistors S2 of the signal controller $212_{11}$ to $212_{1k}$ are simultaneously turned on to output the power supply voltage ELVSS. That is, the signal generation unit $210_1'$ may generate the touch scan signal Tx1 alternately having the voltage V_Tx and the power supply voltage ELVSS during the period T1'. The generated scan touch signal Tx1 is applied to the cathode electrode $306_1$ through the X-axis line XL1.

Next, the signal generation unit $210_2'$ sequentially applies the low level of scan signals applied to the signal lines Gi(k+1) to Gi(2k) and Gw(k+1) to Gw(2k) to the gates of each transistor S1 and S3 of the signal controllers $212_{21}$ to $212_{2k}$ during the period T2' in which the high level of light emitting signals are applied to k+1-th to 2k-th light emitting control lines EM(k+1) to EM(2k) of the light emitting group GEM2. In this case, the transistors S1 and S3 of the signal controllers $212_{21}$ to $212_{2k}$ are sequentially turned on in response to each of the scan signals applied to the scan lines Gi(k+1) to Gi(2k) and Gw(k+1) to Gw(2k) during the period T2' to alternately output the voltage V_Tx and the power supply voltage ELVSS. Further, since the low level of light emitting signals are applied to the k+1-th to 2k-th light emitting control lines EM(k+1) to EM(2k) of the light emitting group GEM2 during the period (for example, T1'), not during the period T2', the transistors S2 of the signal controller $212_{21}$ to $212_{2k}$ are simultaneously turned on to output the power supply voltage ELVSS. That is, the signal generation unit $210_2'$ may generate the touch scan signal Tx2 alternately having the voltage V_Tx and the power supply voltage ELVSS during the period T2'. The generated scan touch signal Tx2 is applied to the cathode electrode $306_2$ through the X-axis line XL2.

In this way, the touch determination unit 600 may transfer the touch scan signals to the cathode electrodes $306_1$ to $306_k$ of all the pixels.

According to the exemplary embodiments of the present invention, it is possible to implement the touch sensing function without changing the image luminance while reducing the number of lines on the backplane in the OLED display.

The above-mentioned exemplary embodiments of the present invention are not embodied only by an apparatus and method. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising: a display unit which includes a plurality of pixels including organic light emitting diodes (OLEDs), the plurality of pixels being divided into a plurality of light emitting groups; a light emitting driving unit which generates a plurality of light emitting signals controlling a light emitting period and a non-light emitting period of each of the plurality of light emitting groups; a touch sensing unit which includes a plurality of first electrodes formed on the plurality of pixels in a first direction and corresponding to each of the plurality of light emitting groups, and a plurality of second electrodes formed on the plurality of first electrodes in a second direction, having an insulating layer therebetween, and outputs a magnitude of voltage between the first electrode and the second electrode by a touch from the outside as a sensing signal; and a touch determination unit which applies a plurality of touch scan signals to each of the plurality of first electrodes during the non-light emitting period of each of the plurality of light emitting groups and determines a touched position in response to the sensing signal of the touch sensing unit, wherein the touch determination unit includes a plurality of signal controllers which generate the plurality of touch scan signals, and each of the plurality of signal controllers includes: a plurality of first transistors which are turned on in response to each of the plurality of scan signals applied to the plurality of scan lines to output a voltage level higher than a first power supply voltage: and a plurality of second transistors which output the first power supply voltage in response to a light emitting signal applied to the corresponding light emitting group.

2. The display device of claim 1, wherein each of the first electrodes is a cathode electrode.

3. The display device of claim 2, wherein the touch scan signal has the voltage level higher than the first power supply voltage during the non-light emitting period.

4. The display device of claim 2, wherein the touch scan signal alternately has the voltage level higher than the first power supply voltage and the first power supply voltage during the non-light emitting period.

5. The display device of claim 4, further comprising:
a scan driving unit which selectively applies a plurality of scan signals to a plurality of scan lines formed in a region corresponding to the corresponding light emitting group during the non-light emitting period of each of the plurality of light emitting groups.

6. The display device of claim 5, wherein:
the touch determination unit outputs the touch scan signal having the voltage level higher than a first power supply voltage to the corresponding first electrode using the plurality of scan signals during the non-light emitting period of each of the plurality of light emitting groups.

7. The display device of claim 6, wherein:
the touch determination unit outputs the first power supply voltage in response to the light emitting signal of the corresponding light emitting group during the light emitting period of each of the plurality of light emitting groups.

8. The display device of claim 2, further comprising:
a scan driving unit which selectively applies a plurality of first and second scan signals to a plurality of first and second scan lines formed in the corresponding region during the non-light emitting period of each of the plurality of light emitting groups.

9. The display device of claim 8, wherein each pixel of the region corresponding to each light emitting group includes:
a first transistor having a control electrode, a first electrode is electrically connected to a first power supply, and a second electrode in which current corresponding to voltage between the control electrode and the first electrode flows;
a second transistor which is turned on in response to the corresponding first scan signal to apply initialization voltage to the control electrode of the first transistor;
a third transistor which is turned on in response to the corresponding second scan signal to diode-connect the first transistor;
a fourth transistor which is turned on in response to the corresponding second scan signal to apply corresponding data voltage to the first electrode of the first transistor; and
a fifth transistor which is turned on in response to the corresponding light emitting signal to transfer current to the OLED, and
the second transistor is turned on by the corresponding first scan signal and then the third and fourth transistors are turned on by the corresponding second scan signal.

10. The display device of claim 9, wherein:
the touch determination unit outputs a touch scan signal alternately having the first power supply voltage and the voltage level higher than the first power supply voltage using the plurality of first and second scan signals during the non-light emitting period of each of the plurality of light emitting groups.

11. The display device of claim 9, wherein the touch determination unit includes a plurality of signal controllers which generate the plurality of touch scan signals, and each of the plurality of signal controllers includes:
a plurality of sixth transistors which are turned on in response to each of the plurality of first scan signals applied to the plurality of first scan lines corresponding to the corresponding light emitting groups to output a first voltage level higher than the power supply voltage;
a plurality of seventh transistors which are turned on in response to each of the plurality of second scan signals applied to the plurality of second scan lines corresponding to the corresponding light emitting groups to output the power supply voltage; and
a plurality of eighth transistors which output the power supply voltage in response to a light emitting signal applied to the corresponding light emitting group.

12. The display device of claim 9, wherein each pixel corresponding to each light emitting group further includes a capacitor which is connected between the first power supply and the control electrode of the first transistor.

13. A driving method of a display device displaying an image through a plurality of pixels each of which is connected to a plurality of data lines, a plurality of scan lines, and a plurality of light emitting control lines and includes a plurality of organic light emitting diodes (OLEDs), the driving method comprising:
applying first voltage level of light emitting signals to light emitting control lines of a first light emitting group among a plurality of light emitting groups during a first period to block a supply of current to the OLED of the first pixel group corresponding to the first light emitting group;

applying a plurality of scan signals applied to a plurality of scan lines of the first pixel group among the plurality of scan lines during the first period;

applying second voltage level of light emitting signals to light emitting control lines of the first light emitting group during a second period to transfer current corresponding to a plurality of first data voltages to the OLED of the first pixel group; and generating a touch scan signal having a voltage level higher than a first power supply voltage by a plurality of first transistors which are turned on in response to each of the plurality of scan signals during the first period;

generating the touch scan signal having the first power supply voltage by a plurality of second transistors in response to the second voltage level of light emitting signals during the second period;

applying the touch scan signal to a first touch sensing unit formed on the first pixel group during the first period; and determining a touch from the outside based on a sensing signal of the first touch sensing unit.

14. The driving method of a display device of claim 13, further comprising:

applying the first voltage level of light emitting signals to light emitting control lines of a second light emitting group among the plurality of light emitting groups during a third period to block a supply of current to the OLED of a second pixel group corresponding to the second light emitting group;

applying the second voltage level of light emitting signals to light emitting control lines of the second light emitting group during a fourth period to transfer current corresponding to a plurality of second data voltages to the OLED of the second pixel group; and determining a touch from the outside, based on a sensing signal of a second touch sensing unit formed on the second pixel group during the third period.

15. The driving method of a display device of claim 14, wherein:

the first touch sensing unit includes a first electrode corresponding to the first light emitting group and formed on the first pixel group in a first direction and a plurality of second electrodes formed in a second direction, and the second touch sensing unit includes a third electrode corresponding to the second light emitting group and formed on the second pixel group in the first direction and the plurality of second electrodes.

16. The driving method of a display device of claim 15, wherein:

the first electrode is cathode electrodes of the plurality of OLEDs of the first pixel group and the second electrode is cathode electrodes of the plurality of OLEDs of the second pixel group.

17. The driving method of a display device of claim 16, wherein:

the cathode electrodes of the plurality of OLEDs of the first and second pixel groups each are formed of a single electrode.

18. The driving method of a display device of claim 14, wherein:

the applying during the first period includes selectively applying a plurality of first scan signals through a plurality of first scan lines each connected to the first pixel groups, and the applying during the third period includes selectively applying a plurality of second scan signals through a plurality of second scan lines each connected to the second pixel groups.

19. The driving method of a display device of claim 18, wherein the determining of the touch during the first period includes:

using the plurality of first scan signals to generate a first touch scan signal; and applying the first touch scan signal to the first electrode, and the determining of the touch during the third period includes:

using the plurality of second scan signals to generate a second touch scan signal; and applying the second touch scan signal to the third electrode.

* * * * *